UNITED STATES PATENT OFFICE.

WILLIAM ROY MOTT, OF LAKEWOOD, OHIO, ASSIGNOR TO NATIONAL CARBON COMPANY, OF CLEVELAND, OHIO, A CORPORATION OF NEW JERSEY.

ELECTRODE FOR ARC-LAMPS.

1,205,377.      Specification of Letters Patent.      Patented Nov. 21, 1916.

No Drawing.     Application filed November 8, 1911. Serial No. 659,203.

*To all whom it may concern:*

Be it known that I, WILLIAM ROY MOTT, a citizen of the United States, residing at Lakewood, in the county of Cuyahoga and State of Ohio, have invented a certain new and useful Improvement in Electrodes for Arc-Lamps, of which the following is a full, clear, and exact description.

This invention relates to electrodes for use in arc lamps, and more particularly in flaming arc lamps, the object being to produce an electrode which will impart a desired color to the arc stream and insure a non-flickering, steady light, as well as insure a field of light of great intensity and volume. These results I obtain by the use of titanium in chemical combination with other suitable substances.

I am aware that titanium has heretofore been used as an ingredient for an arc light electrode, the same being disclosed in United States Patents Nos. 421,469, and 422,302. These patents disclose the use of titanium in the form of titanic iron, which as is well known, contains titanium oxid.

My invention distinguishes from the disclosures in these patents in that I use titanium in the form of a titanate of a metal belonging to the group of alkaline earth elements, such as calcium, barium, strontium, zinc, etc., or a metal belonging to the group of rare earth elements, which include cerium, lanthanum, didyum, thorium, etc. I have also found it advantageous to use two or more titanates of different metals to form a part of the same electrode mixture, because of the decreased tendency to form a slag.

The advantages to be obtained by the use of a titanate or titanates, are increased when the titanate is mixed with a fluorid of a metal belonging to either the group of alkaline earth elements, or to the group of rare earth elements. As an example, I may use rare-earth titanate and rare-earth fluorid, and I may use two or more fluorids in the same electrode mixture in the same manner as explained with relation to the titanate.

In the making of my electrode, the titanate and fluorid, if this be used, are mixed with carbon in proportions which may be found suitable to produce an electrode of desired characteristics. I have found that an electrode containing both titanate and fluorid gives most desirable results, and develops the greatest candle power under comparative conditions.

With a cored carbon using as a filling mixture calcium fluorid, calcium titanate and calcined carbon under like conditions and tests, the following results were obtained with electrodes containing the proportions of the materials as stated below. The whiteness, steadiness and volume of light are considerably greater with the mixture than when using their constituents separately.

| Lot. | Calcium fluorid. | Calcium titanate. | Calcined carbon. | M. S. C. P. |
|---|---|---|---|---|
|  | *Parts.* |  |  |  |
| 1 | 60 | 0 | 40 | 896 |
| 2 | 40 | 20 | 40 | 1076 |
| 3 | 20 | 40 | 40 | 1063 |
| 4 | 0 | 60 | 40 | 983 |

"M. S. C. P." denotes mean spherical candle power.

It has heretofore been found that flaming arc electrodes giving a substantially white light have been obtained at a sacrifice of candle power, while I have found that an electrode having as ingredients therein the materials heretofore mentioned in the specification, has an increased candle power, and at the same time produces a substantially white light. As will be seen from the above table, electrodes Nos. 2 and 3 producing a substantially white light, give a candle power greatly in excess of electrode No. 1, which produces a color substantially the same as the ordinary yellow flaming electrode, and the candle power of these electrodes 2 and 3 is also greater than electrode No. 4, which produces a substantially white light.

The carbon used may be any of the well known forms, as calcined lamp black, coke, coal, graphite, or charcoal with tar. It also may be of advantage to use potassium salts as a part of the mix, as it is well known that such salts assist in securing a steady burning.

The carbon, titanate and fluorid and such other substances as it may be desired to incorporate are thoroughly mixed together with a binder, such as pitch or analogous substance. This mixture is forced through dies to produce electrodes of the desired form or the electrodes may be molded. The electrodes are then baked in suitable furnaces.

It may be desirable to use the titanate and fluorid as core material for a shell carbon, in which event, the shell carbon may be prepared as is at present the custom, or the shell carbon itself may contain the titanate and fluorid material. In any event, the core material will comprise calcined carbon, titanate and fluorid materials mixed with some suitable binding material, as water glass, etc. This material may be forced into the core of the shell carbon in any desired manner.

The titanates and fluorids used as herein disclosed may be such as are synthetically prepared, or as these materials occur in nature, as for instance, peroskite which is mineral calcium titanate, or monazite sands, which carry the rare earths.

Having thus described my invention, what I claim is:

1. An arc lamp electrode containing a rare-earth titanate.

2. An arc lamp electrode containing carbon and rare-earth titanates.

In testimony whereof, I hereunto affix my signature in the presence of two witnesses.

WILLIAM ROY MOTT.

Witnesses:
  A. J. HUDSON,
  H. R. SULLIVAN.